UNITED STATES PATENT OFFICE 2,213,731

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application April 19, 1939,
Serial No. 268,822

8 Claims. (Cl. 260—205)

This invention relates to the preparation of a new series of azo dyes. More particularly it relates to water-soluble aromatic azo dyes containing phosphorus.

I have discovered that a valuable series of water-soluble aryl azo dyes suitable for the coloration of organic derivatives of cellulose, silk and wool can be prepared by coupling suitable aromatic diazonium salts with arylamines having the following general formula:

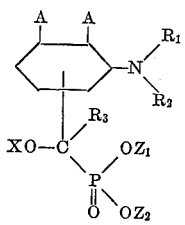

wherein $R_1$, $R_2$, and $R_3$ represent members selected from the group consisting of hydrogen, alkyl, hydroxyalkyl, alkoxyalkyl, acyloxyalkyl, acylalkyl, sulfoalkyl, sulfatoalkyl, cycloalkyl, alkylene, aralkyl, aryl, and heterocyclic groups, X represents hydrogen or an acyl group, A represents hydrogen, halogen, alkyl, and alkoxy groups, and $Z_1$ and $Z_2$ represent hydrogen, ammonium radical or an alkali forming metal. The phosphomethyl group may be substituted on the benzene nucleus in either the ortho or meta positions in relation to the amino group.

The structure of my new azo compounds may be represented by the general formula:

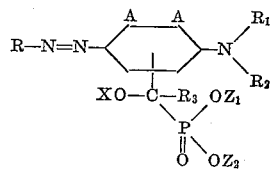

wherein R stands for an aromatic nucleus, and $R_1$, $R_2$, $R_3$, X, A, $Z_1$ and $Z_2$ have the meaning given above.

It is an object, therefore, of my invention to prepare dyes of the class above described and to color cellulose organic derivatives, silk and wool in the form of threads, yarns, filaments, and fabric materials therewith.

The coupling amines of my invention are prepared in general as follows:

An aromatic hydrocarbon, substituted or not by one or more monovalent substituents, such as benzene, toluene, o-xylene, anisol, chlorobenzene and the like (I) is first converted to an aldehyde (II) by the action of carbon monoxide in the presence of a catalyst. The resulting aldehyde is then nitrated to the m-nitroaldehyde (III) by the usual nitration procedures. The latter compound is treated with phosphorus trichloride in an acetic acid solution following in general a method similar to that described by J. B. Conant and A. D. MacDonald in the Journal of the American Chemical Society 42 2337 (1920). The nitro group of m-phosphonic acid derivative (IV) of the nitrobenzene compound obtained is then reduced to the corresponding amine (V), either chemically with iron and hydrochloric acid or catalytically with nickel and hydrogen. The amine group may then be alkylated and/or arylated by known methods to produce the coupling amines of my invention designated by formula (VI).

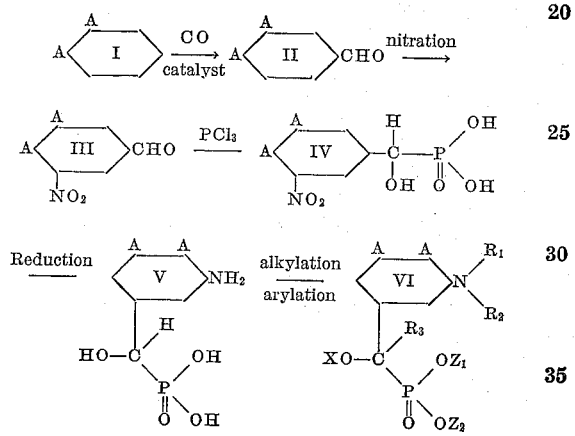

The following examples illustrate the preparation of the azo compounds of my invention.

Example 1

12.6 grams of o-chloroaniline are diazotized in the usual manner and added to an iced aqueous solution of the disodium salt of meta-aminohydroxybenzyl phosphonic acid. Concurrently with the addition of the diazonium halide there is added an aqueous solution of sodium carbonate at such a rate that the mixture is slightly alkaline to litmus. When coupling is complete, the dye is salted out, filtered, washed and dried. The dye colors cellulose acetate, silk and wool yellow from an aqueous solution of the dye which may contain salt. The dye compound so produced has the following structural formula:

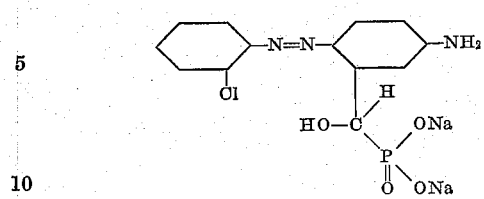

Example 2

The diazo solution of Example 1 is coupled with an equivalent amount of the disodium salt of m-ethylamino butylhydroxybenzyl phosphonic acid following the procedure of Example 1. The dye colors cellulose acetate, silk and wool yellow shades from aqueous solutions of the dye which may contain salt. The dye compound has the following formula:

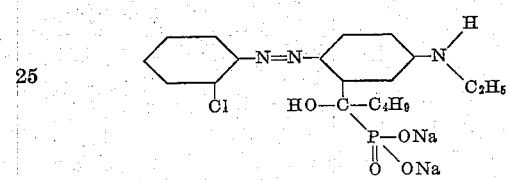

Example 3

One mole of methyl anthranilate is diazotized as usual and coupled with one mole of the disodium salt of m-butylaminohydroxybenzyl phosphonic acid following the procedure described in Example 1. The dye colors cellulose acetate, silk and wool yellow shades from aqueous solutions of the dye which may contain salt. The dye compound has the formula:

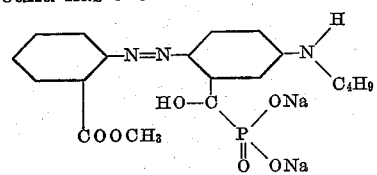

Example 4

One mole of p-amino acetophenone is diazotized and coupled with one mole of the disodium salt of 3 - dihydroxyethylamino - 4 - methoxy-hydroxybenzyl phosphonic acid following the procedure described in Example 1. The dye colors cellulose acetate, silk and wool orange shades from an aqueous solution of the dye which may contain salt. The dye compound has the formula:

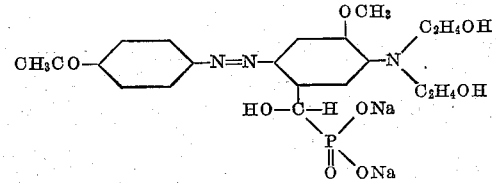

The invention is further illustrated by reference to the following table. The compound listed under the heading "Amine" is diazotized and coupled with an equivalent quantity of the specified compound in the column entitled "Coupling component," the dye resulting therefrom coloring cellulose acetate, silk and wool the shades designated under the heading "Shade on textile materials." In each case, the preparation of the dye and the process of dyeing therewith followed the procedure described in Example 1.

| Amine | Coupling component | Shade on cellulose acetate |
|---|---|---|
| 1-amino-2-chlorobenzene | (structure with $NH_2$, $C-H$, $ONH_4$, $OCOCH_3$, $O$, $ONH_4$) | Yellow. |
| Do | (structure with $OCH_3$, $NH_2$, $HO-C-H$, $OH \cdot H_2NC_2H_4NH_2$, $P$, $O$, $OH \cdot H_2NC_2H_4NH_2$) | Do. |
| Do | (structure with $OCH_3$, $NH_2$, $C_2H_5$, $HO-C$, $ONH_4$, $P$, $O$, $ONH_4$) | Do. |
| Do | (structure with $O$, $NH_2$, $CH_3$, $HO-C$, $OK$, $P$, $O$, $OK$) | Do. |

| Amine | Coupling component | Shade on cellulose acetate |
|---|---|---|
| 1-amino-4-nitrobenzene | Phenyl-N($C_2H_4OCOCH_3$)($C_2H_4COCH_3$), with HO—CH—P(=O)(ONa)(ONa) substituent | Red. |
| 1-amino-2-chloro-4-nitrobenzene | Phenyl with $OC_2H_5$ and N($CH_2.CHOH.CH_2OH$)$_2$, with HO—CH—P(=O)(ONa)(ONa) substituent | Wine. |
| 1-amino-2-bromo-4-nitrobenzene | Phenyl with $OCH_3$, $OCH_3$, NH-phenyl, $C_{11}H_{23}$, with HO—CH—P(=O)(ONa)(ONa) substituent | Red. |
| 1-amino-2-hydroxy-4-nitrobenzene | Phenyl-N($C_2H_5$)$_2$, with HO—CH—P(=O)(ONH$_4$)(ONH$_4$) substituent | Pink-red. |
| 1-amino-2-chloro-4-nitrobenzene | Phenyl with $CH_3$ and NH($C_2H_4SO_3Na$), with HO—CH—P(=O)(ONa)(ONa) substituent | Red. |
| 1-amino-2-methyl-4-nitrobenzene | Phenyl-NH-$C_{16}H_{33}$, with $CH_2$-phenyl-$SO_3Na$ and HO—CH—P(=O)(ONa)(ONa) substituent | Orange-red. |
| 1-amino-2,6-dichloro-4-nitrobenzene | Phenyl-N($C_2H_4OH$)($CH_2$-CHOH-$CH_2OH$), with HO—CH—P(=O)(ONH$_4$)(ONH$_4$) substituent | Brown-red. |

| Amine | Coupling component | Shade on cellulose acetate |
|---|---|---|
| p-Amino azo benzene | ![structure with OCH₃, C₂H₅, N, C₂H₄OCH₃, C₁₅H₃₁, HO—C, ONa, P=O, ONa] | Red. |
| 1-amino-2,4-dinitro benzene | ![structure with NH—COCH₃, C₂H₄OH, N, C₂H₄OH, H, HO—C, ONa, P=O, ONa] | Blue. |
| Do | ![structure with C₄H₉, N, CH₂—CH₂, CH₂—CH, O, CH₂, HO—C—H, ONH₄, P=O, ONH₄] | Violet. |
| Do | ![structure with OCH₃, C₂H₄OH, N, C₂H₄OH, HO—C—H, ONa, P=O, ONa] | Purple. |

The azo dyes of my invention being water-soluble they may be used for the direct coloration of organic derivatives of cellulose, silk and wool in the form of threads, yarns, filaments and fabric materials without the necessity of employing a dispersing or solubilizing agent. The dyeing operations will be conducted in accordance with the usual dyeing practice, salt being added if desired to facilitate exhaustion of the dye bath. For a more detailed description as to how the water-soluble azo dyes of my invention may be employed for the coloration of textile materials, reference may be had to U. S. Patent No. 2,107,898 issued February 8, 1938.

Typical organic derivations of cellulose include the hydrolyzed as well as the unhydrolyzed cellulose organic acid esters and cellulose mixed organic acid esters such as cellulose acetate, cellulose formate, cellulose propionate, cellulose butyrate, cellulose acetate-propionate, cellulose acetate-butyrate, and cellulose ethers such as methyl cellulose, ethyl cellulose, and benzyl cellulose.

I claim:

1. The azo compounds having the general formula:

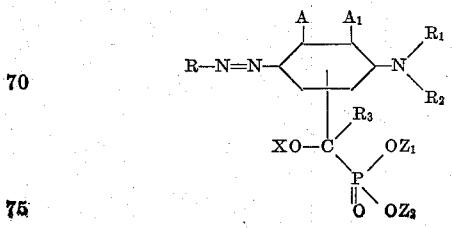

wherein R represents an aryl nucleus of the benzene series, $R_1$ and $R_2$ each represents a member selected from the group consisting of hydrogen, an aliphatic group, a furfuryl group, and a benzyl group, $R_3$ represents a member selected from the group consisting of hydrogen, an alkyl group, and a benzyl group, X represents a member selected from the group consisting of hydrogen, and an acetyl group, A and $A_1$ each represents a member selected from the group consisting of hydrogen, a halogen atom, an acetamino group, an alkyl group, an alkoxy group, and a phenoxy group, and $Z_1$ and $Z_2$ each represents a member selected from the group consisting of hydrogen, an ammonium radical, and an alkali forming metal.

2. The azo compounds having the general formula:

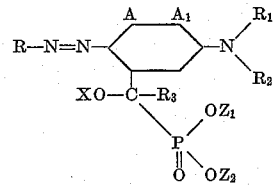

wherein R represents an aryl nucleus of the benzene series, $R_1$ and $R_2$ each represents a member selected from the group consisting of hydrogen, an aliphatic group, a furfuryl group, and a benzyl group, $R_3$ represents a member selected from the group consisting of hydrogen, an alkyl group, and a benzyl group, X represents a member selected from the group consisting of hydrogen, and an acetyl group, A and $A_1$ each represents a member selected from the group consisting of hydrogen, a halogen atom, an acetamino group, an alkyl group, an alkoxy group, and phenoxy group, and $Z_1$ and $Z_2$ each represents a member selected from the group consisting of hydrogen, an ammonium radical, and an alkali forming metal.

3. The azo compounds having the general formula:

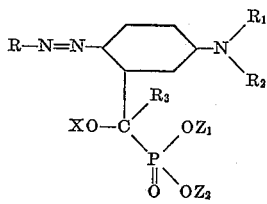

wherein R represents an aryl nucleus of the benzene series, $R_1$ and $R_2$ each represents a member selected from the group consisting of hydrogen, an aliphatic group, a furfuryl group, and a benzyl group, $R_3$ represents a member selected from the group consisting of hydrogen, an alkyl group, and a benzyl group, X represents a member selected from the group consisting of hydrogen, and an acetyl group, and $Z_1$ and $Z_2$ each represents a member selected from the group consisting of hydrogen, an ammonium radical, and an alkali forming metal.

4. The azo compounds having the general formula:

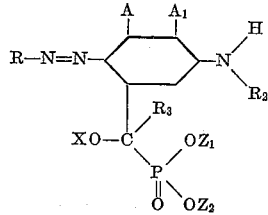

wherein R represents an aryl nucleus of the benzene series, $R_2$ represents a member selected from the group consisting of hydrogen, an aliphatic group, a furfuryl group, and a benzyl group, $R_3$ represents a member selected from the group consisting of hydrogen, an alkyl group, and a benzyl group, X represents a member selected from the group consisting of hydrogen, and an acetyl group, A and $A_1$ each represents a member selected from the group consisting of hydrogen, a halogen atom, an acetamino group, an alkyl group, an alkoxy group, and a phenoxy group, and $Z_1$ and $Z_2$ each represents a member selected from the group consisting of hydrogen, an ammonium radical, and an alkali forming metal.

5. The azo compounds having the general formula:

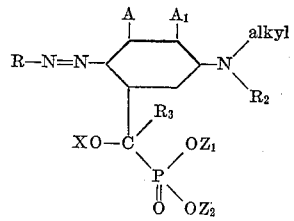

wherein R represents an aryl nucleus of the benzene series, $R_2$ represents a member selected from the group consisting of hydrogen, an aliphatic group, a furfuryl group, and a benzyl group, $R_3$ represents a member selected from the group consisting of hydrogen, an alkyl group, and a benzyl group, X represents a member selected from the group consisting of hydrogen, and an acetyl group, A and $A_1$ each represents a member selected from the group consisting of hydrogen, a halogen atom, an acetamino group, an alkyl group, an alkoxy group, and a phenoxy group, and $Z_1$ and $Z_2$ each represents a member selected from the group consisting of hydrogen, an ammonium radical, and an alkali forming metal.

6. Material made of or containing an organic derivative of cellulose colored with a dye selected from the class of azo compounds having the general formula:

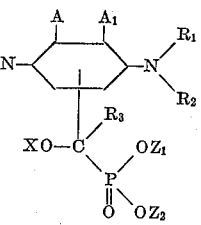

wherein R represents an aryl nucleus of the benzene series, $R_1$ and $R_2$ each represents a member selected from the group consisting of hydrogen, an aliphatic group, a furfuryl group, and a benzyl group, $R_3$ represents a member selected from the group consisting of hydrogen, an alkyl group, and a benzyl group, X represents a member selected from the group consisting of hydrogen, and an acetyl group, A and $A_1$ each represents a member selected from the group consisting of hydrogen, a halogen atom, an acetamino group, an alkyl group, an alkoxy group, and a phenoxy group, and $Z_1$ and $Z_2$ each represents a member selected from the group consisting of hydrogen, an ammonium radical, and an alkali forming metal.

7. Material made of or containing cellulose acetate colored with a dye selected from the class of azo compounds having the general formula:

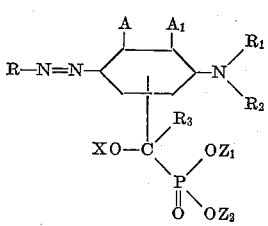

wherein R represents an aryl nucleus of the benzene series, $R_1$ and $R_2$ each represents a member selected from the group consisting of hydrogen, an aliphatic group, a furfuryl group, and a benzyl group, $R_3$ represents a member selected from the group consisting of hydrogen, an alkyl group, and a benzyl group, X represents a member selected from the group consisting of hydrogen, and an acetyl group, A and $A_1$ each represents a member selected from the group consisting of hydrogen, a halogen atom, an acetamino group, an alkyl group, an alkoxy group, and a phenoxy group, and $Z_1$ and $Z_2$ each represents a member selected from the group consisting of hydrogen, an ammonium radical, and an alkali forming metal.

8. Material made of or containing cellulose acetate colored with a dye selected from the class of azo compounds having the general formula:

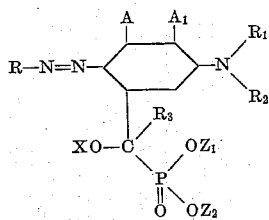

wherein R represents an aryl nucleus of the benzene series, $R_1$ and $R_2$ each represents a member selected from the group consisting of hydrogen, an aliphatic group, a furfuryl group, and a benzyl group, $R_3$ represents a member selected from the group consisting of hydrogen, an alkyl group, and a benzyl group, X represents a member selected from the group consisting of hydrogen, and an acetyl group, A and $A_1$ each represents a member selected from the group consisting of hydrogen, a halogen atom, and acetamino group, an alkyl group, an alkoxy group, and a phenoxy group, and $Z_1$ and $Z_2$ each represents a member selected from the group consisting of hydrogen, an ammonium radical, and alkali forming metal.

JOSEPH B. DICKEY.